May 26, 1925.  1,539,079

E. C. FILSTRUP

SAW SWAGING MACHINE

Filed Dec. 10, 1921  7 Sheets-Sheet 1

Inventor

Eddie C. Filstrup per

Sheridan, Jones, Sheridan & Smith

Attorneys

May 26, 1925.
E. C. FILSTRUP
SAW SWAGING MACHINE
Filed Dec. 10, 1921
1,539,079
7 Sheets-Sheet 2
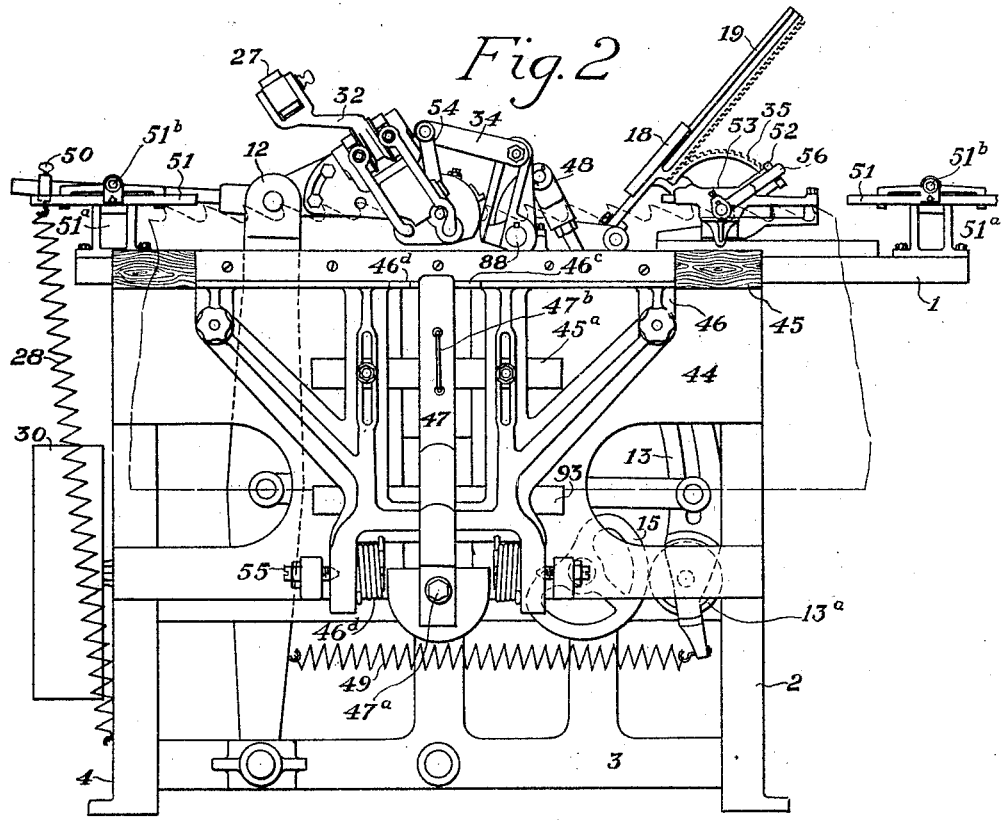
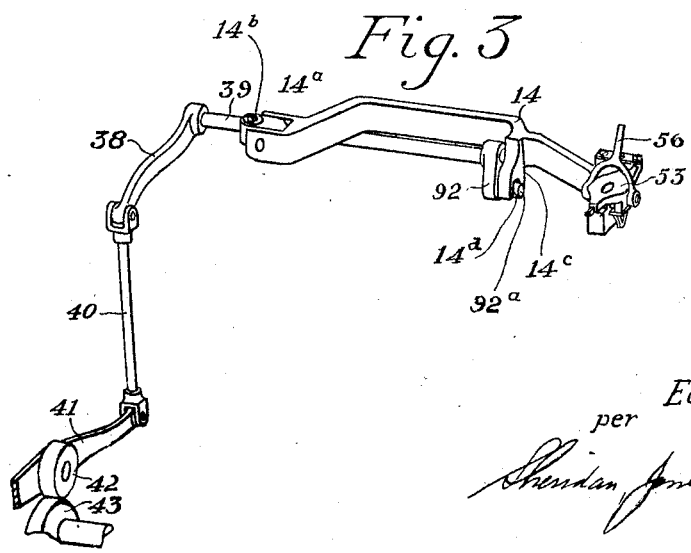
Inventor
Eddie C. Filstrup
per
Attorneys May 26, 1925.

E. C. FILSTRUP

SAW SWAGING MACHINE

Filed Dec. 10, 1921 — 7 Sheets-Sheet 3

Inventor
Eddie C. Filstrup
per
Sheridan, Jones, Sheridan & Smith
Attorneys

May 26, 1925.

E. C. FILSTRUP

SAW SWAGING MACHINE

Filed Dec. 10, 1921

Inventor
Eddie C. Filstrup
per
Sheridan, Jones, Sheridan & Smith
Attorneys

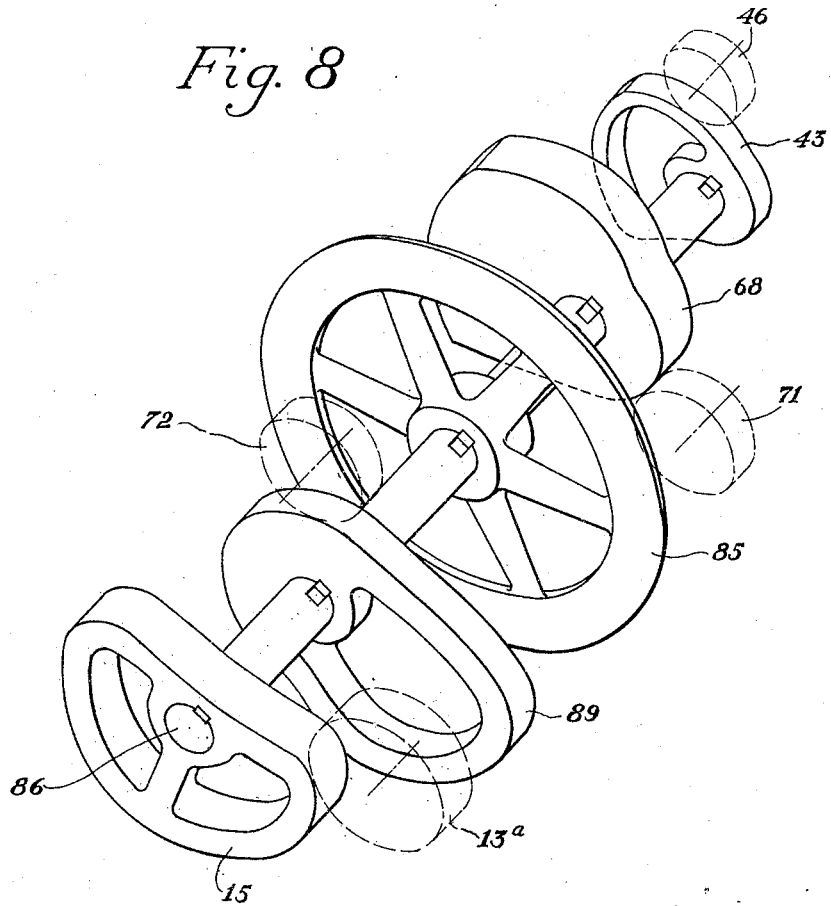

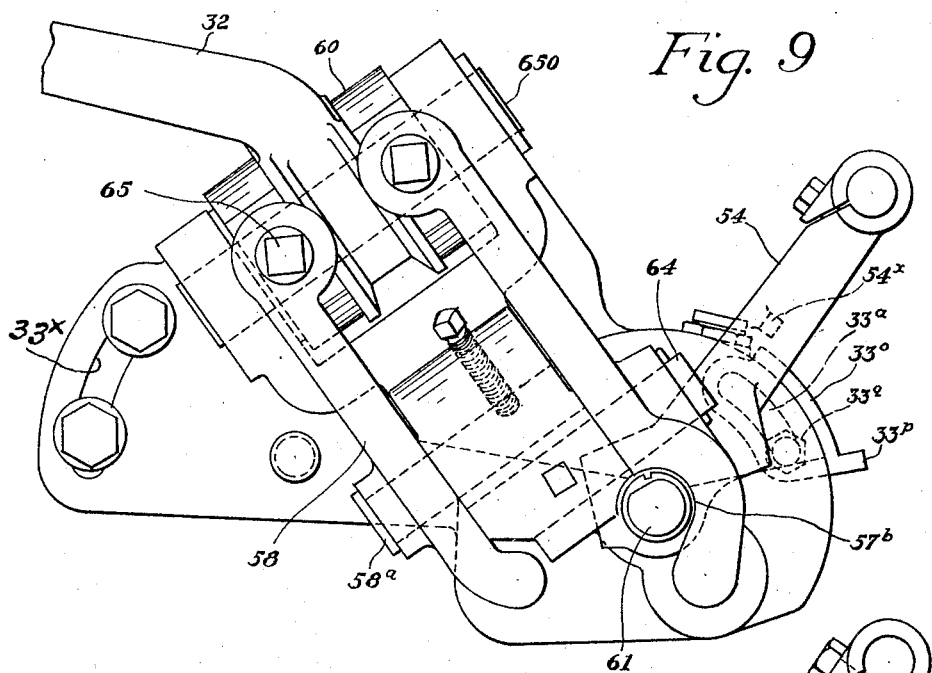
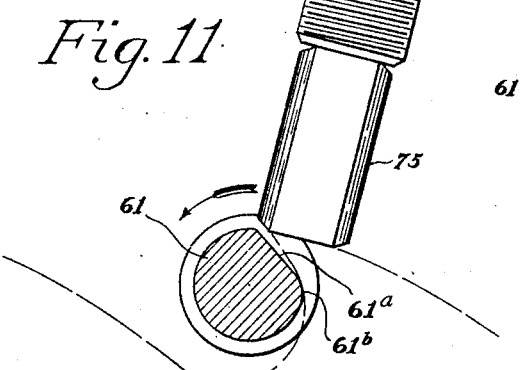
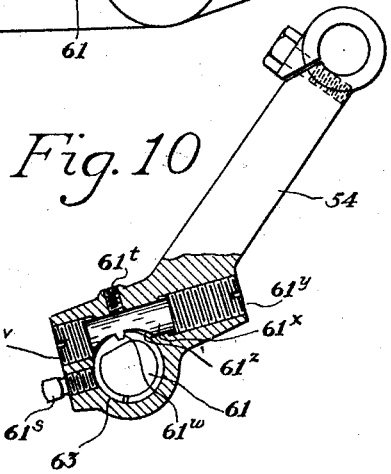
Inventor
Eddie C. Filstrup

May 26, 1925.
E. C. FILSTRUP
SAW SWAGING MACHINE
Filed Dec. 10, 1921
1,539,079
7 Sheets-Sheet 7
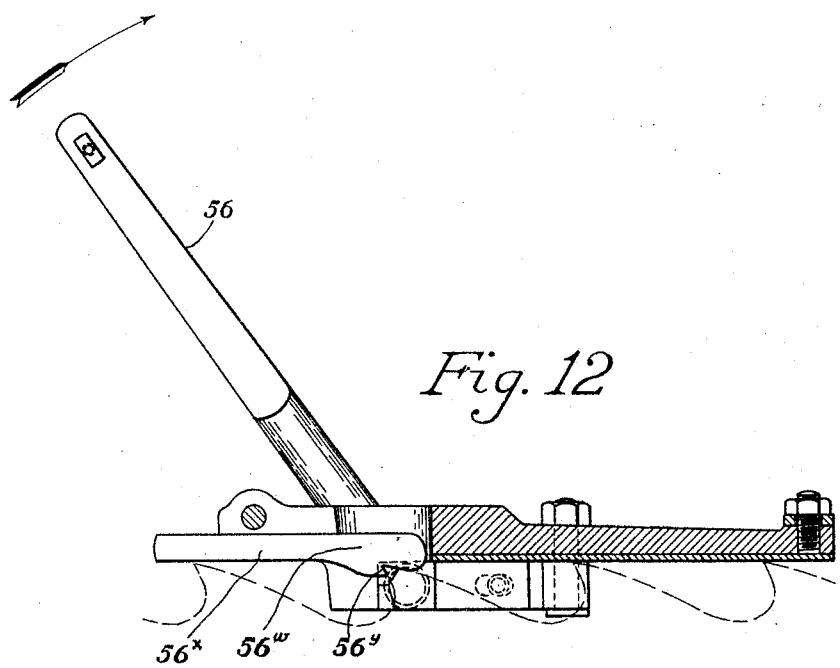
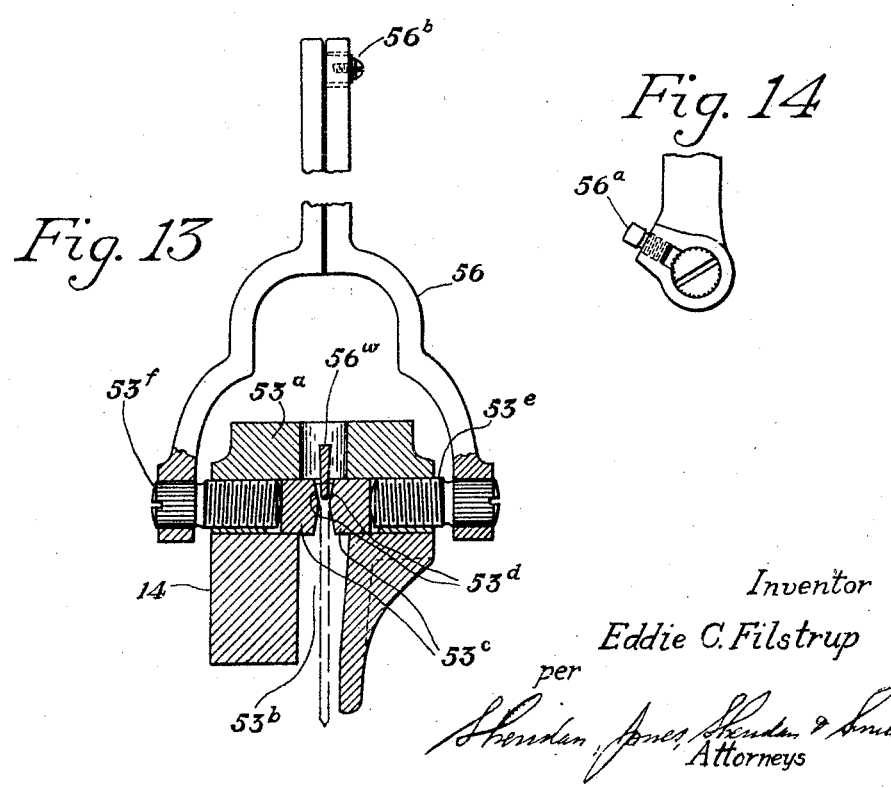
Inventor
Eddie C. Filstrup Patented May 26, 1925.

1,539,079

UNITED STATES PATENT OFFICE.

EDDIE C. FILSTRUP, OF BENTON HARBOR, MICHIGAN, ASSIGNOR TO COVEL MFG. CO., OF BENTON HARBOR, MICHIGAN, A CORPORATION OF MICHIGAN.

SAW-SWAGING MACHINE.

Application filed December 10, 1921. Serial No. 521,295.

*To all whom it may concern:*

Be it known that I, EDDIE C. FILSTRUP, a citizen of United States, residing at Benton Harbor, in the county of Berrien and State of Michigan, have invented certain new and useful Improvements in a Saw-Swaging Machine, of which the following is a specification.

This invention relates to saw swaging machines and has for its principal object to provide a machine which will mechanically and automatically swage and size the teeth of saws, particularly band saws such as are used in the lumber and other industries.

Briefly, my machine comprises means for supporting and guiding a saw such as a band saw, intermittently feeding or advancing the same through the machine, intermittently clamping the saw during treatment thereof, swaging a tooth tip, and shaping or sizing a tooth which has been swaged.

In the use of band saws, for example, in the cutting of lumber, logs, etc., it is necessary to frequently swage the saw tooth tips in order to insure proper clearance for the body of the saw traveling through the material. Where this operation is performed by hand, the only successful method heretofore employed consumed a considerable amount of time and labor, and it is the purpose and object of my machine to perform these operations more accurately, efficiently, and economically.

Preliminary to a more detailed discussion of the construction and operation of my machine, I would state that in the operation of the machine the saw to be treated, if a band saw, is supported upon suitable pedestal guides, or the like, of convenient construction, the same being locatable where desired and provided with rollers, or the like, to directly support the saw to substantially eliminate resistance to the movement of the band saw.

My machine first feeds or advances the saw a distance corresponding to the pitch of the teeth, whereafter a clamping means is actuated which will engage or clamp the saw for the treatment thereof. Subsequent to the clamping of the saw, the swaging die is moved into operative position and is actuated to swage the tip of the tooth between a rotating die and a relatively stationary anvil, which will be described more in detail below. At the same time a shaping or sizing member, located in advance of the swaging means with respect to the direction of the feeding of the saw, is moved into operative position with respect to a swaged tooth and thereafter actuated to properly size or shape the tip of the tooth, thereby insuring uniformity in the width of the swaged teeth. At the conclusion of these operations which are substantially coincident, the clamping means is released, the shaping means moved out of operative position and retracted and the swaging means is retracted to engagement with another tooth, after which it is actuated to advance the feed of the saw preliminary to a new cycle of operation. Means is provided to frictionally resist the movement of the saw at all times through the machine so that there is no danger of a slip or undesirable movement when the clamping means is not in engagement.

Various adjustments are provided for the handling of saws of different sizes and saws with teeth of different pitch; also means is provided for varying the travel of the swage in accordance with the conditions under which the saw must operate. While the embodiment shown is practically adapted for use in treatment of band saws it will be obvious to those skilled in the art that the same might be readily adapted to use with other types of saws, if so desired.

The above objects and mechanism are more fully described and shown in the following specification and accompanying drawings in which—

Fig. 2 is a front elevation of the machine showing the parts in position after swaging and shaping;

Fig. 3 is a perspective or detail view of the shaper moving means;

Fig. 8 is a perspective of the cam shaft showing the relative position of the actuated cams;

Fig. 9 is a side elevation of the swaging member;

Fig. 10 is a vertical section through the swaging die carrying means showing the means for adjustment of and locking the die;

Fig. 11 is a detail of the relative position of the die and anvil, the saw being indicated by dotted lines;

Fig. 12 is a vertical section through the shaping or sizing means;

Fig. 13 is a vertical transverse section of the same taken at right angles to the section of Fig. 12; and Fig. 14 is a detail of the actuated lever of the shaping mechanism.

Like numerals refer to like elements throughout the drawings.

Figure 1:
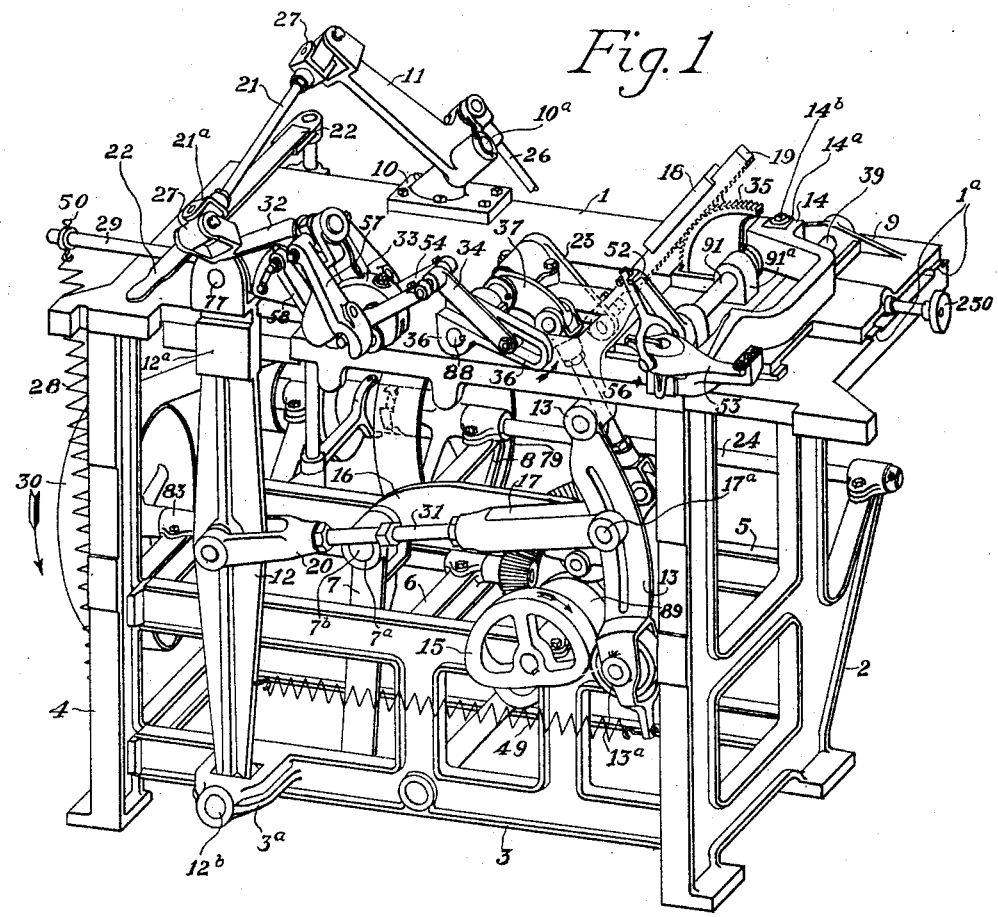
Figure 1 is a perspective of my machine, the front plate, guides and clamp being removed for the purpose of convenience and clearness, the parts being shown in position preliminary to swaging and shaping.
Figure 4:
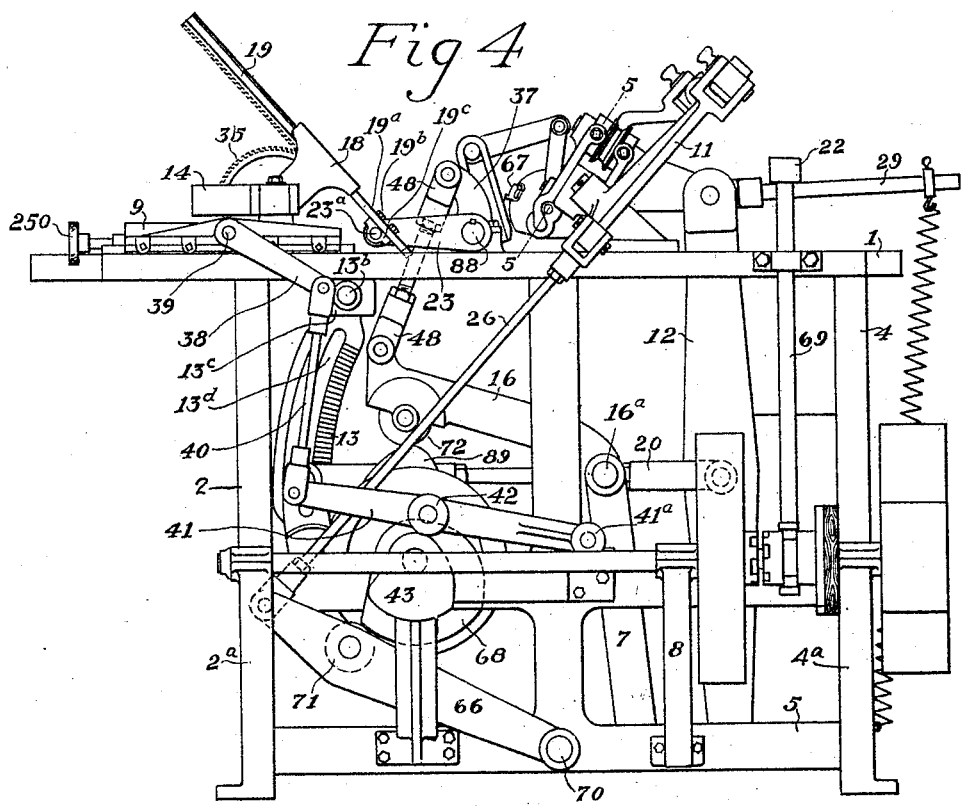
Fig. 4 is a rear elevation of the machine with the parts in position, as in Fig. 2.
Figure 5:
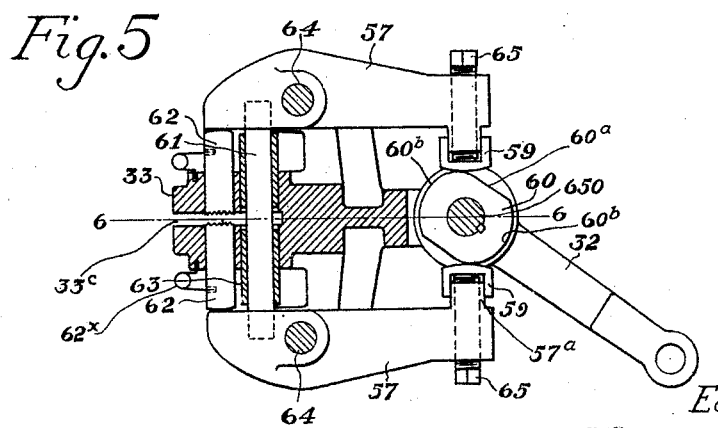
Fig. 5 is a section through the swaging body parallel to the clamping levers and through the center of the die.

Referring to Figs. 1, 2, 4 and 7, for example, 2 indicates the right hand end frame as viewed from the front of the machine; 3 the front side frame; 4 the left hand end frame, and 5 the rear frame. A center brace 6 extends between the front and rear frames 3—5 respectively.

Attached to the front frame 3 is the upstanding bracket 7, provided with suitable bearings 7$^a$, in which and extending between which is journaled the pin or shaft 7$^b$ carried by a rocker arm 16 hereinafter described. Projecting outwardly from the rear frame 5 is the bracket 8 in which is journaled the shaft 24. Adjacent its ends the shaft 24 is also journaled in the integral brackets 2$^a$—4$^a$ projecting outwardly from the end frames 2—4. (See Fig. 7.)

1 designates the table supported upon the frame members provided adjacent one end with dovetail or intercut ribs 1$^a$, which are engaged by similarly shaped grooves in a sliding plate 9, which is a carrier for the shaper or sizer and a portion of the actuating mechanism therefor. Secured to the table 1 by bolts, or the like, is plate 10 having an upwardly inclined stud 10$^a$ upon which is journaled the bell-crank 11. Projecting upwardly from and at the bottom of the front frame 3 is the box bracket 3$^a$ within which is journaled the pin 12$^b$ carried by the oscillating arm 12 at its lower extremity.

Extending between the front and rear frames is a cam shaft 86, suitably journaled in the journal boxes 86$^a$—86$^b$. (See Fig. 7.)

Upon this cam shaft 86 are the actuating cams 15 for actuating the saw feeding means; cam 89 for actuating the saw swaging die and also the saw shaping dies; cam 68 for actuating the saw clamping means and cam 43 for actuating the shaper moving means.

Figure 7:
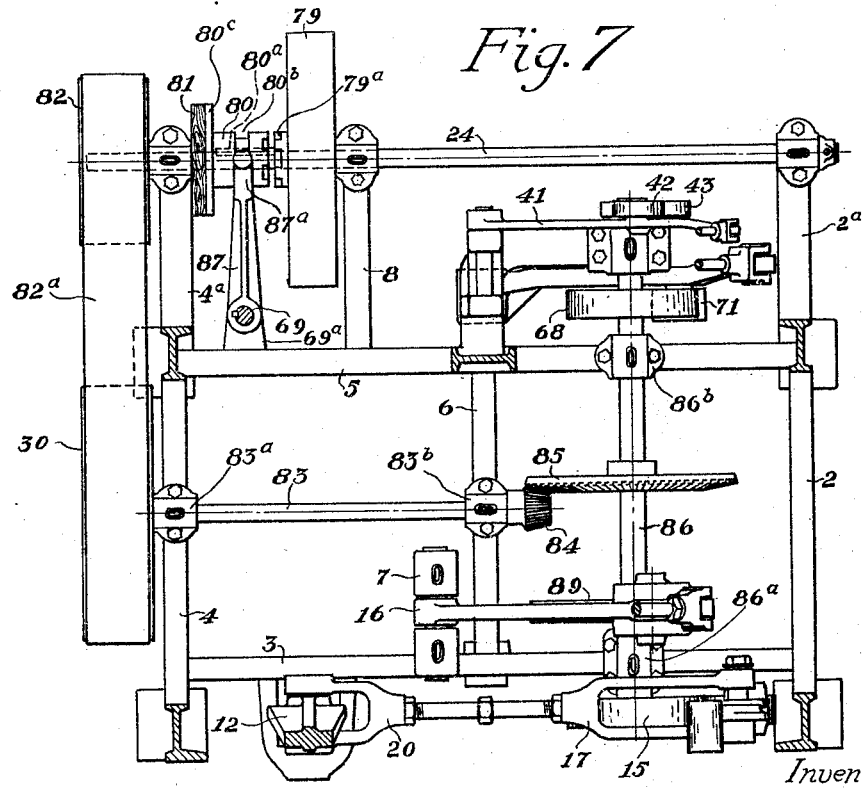
Fig. 7 is a horizontal section through the machine showing the power shafts, cam shafts, etc.

Power is transmitted to the cam shaft from power shaft 24 by means of the following mechanism:

Pulley 79 is rotatably mounted on shaft 24 and may be driven by belt or the like, or any suitable source of power. Clutch member 80 is slidable on shaft 24 and guided thereto by die key 80$^a$. A clutch operating lever 87 is provided having bifurcated extremity 87$^a$ in engagement with the peripheral groove 80$^b$ and clutch 80. Keyed or otherwise secured to the shaft 24 at the extremity thereof is the pulley 82. A wooden brake block 81 is provided which may be contacted by the disk portion 80$^c$ of the clutch when the same is shifted to non-operating position as shown in Fig. 7. The vertically arranged shaft 69 is keyed or otherwise secured to the clutch arm 87 and extends upwardly through suitable brackets 69$^a$ on the rear frame 5. An actuating handle 22 is secured to the upper portion of the rod 69 and is movable to shift clutch 80 into or out of engagement with the tooth hub 79 in a well known manner. When the clutch 80 is shifted to the right from the position shown in Fig. 7, power will be transmitted from pulley 79 to shaft 24, pulley 82 and through belt 82$^a$ to pulley 30, which is carried upon countershaft 83, journaled in suitable bearings 83$^a$—83$^b$ in the end frame 4 and center brace 6 respectively. When driving is to be discontinued clutch 80 is shifted to position shown in Fig. 7 in contact with the brake block 81, the resulting friction serving to greatly retard the momentum of the mechanism.

Carried at one extremity of the countershaft 83 is the beveled pinion 84 meshing with beveled gear 85, which is secured to and rotates with the cam shaft 86.

Coacting with the cam 15 is the rocker arm 13, carrying adjacent one extremity a roller 13$^a$ (see Figs. 1-2 for example). This rocker arm is provided at its upper extremity with pin 13$^b$ journaled in the block 13$^c$ carried at the under side of table 1. The arm 13 is provided with arcuate slot 13$^d$ and is corrugated or roughened at one face on either side of said slot. Adjustably attached to the rocker arm 13 is clevis 17 having a bolt or the like 17$^a$ extending through the slot 13$^d$ and operable to clamp the clevis 17 at any adjusted position along the rocker arm 13. Threadedly secured to the clevis 17 is the rod 31 pivotally secured at its other extremity to an oscillatable lever 12, the clevises 17 and 20 and the rod 31 comprising a connecting link between rocker arm 13 and lever 12. A spring 49 extends between lever 12 and arm 13 and serves to maintain the latter in contact with cam 15.

Figure 6:
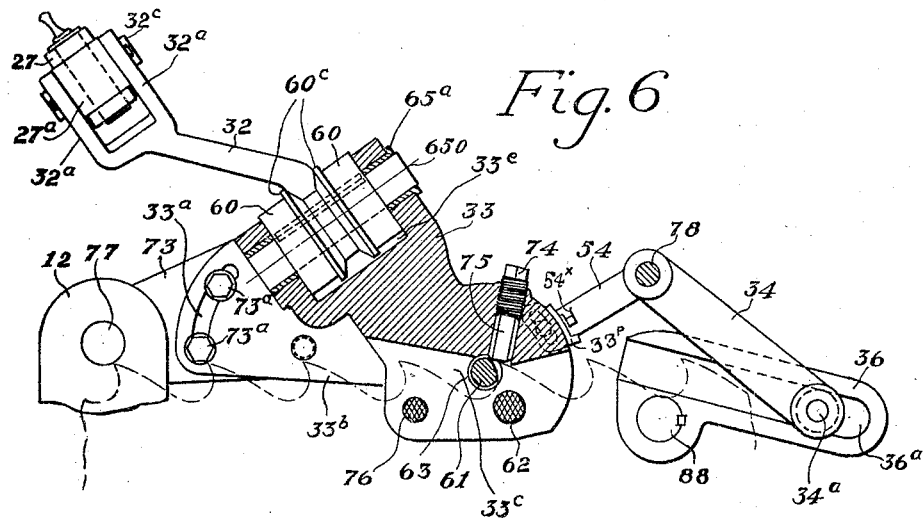
Fig. 6 is a vertical section through the body of the swaging member, showing a portion of the actuating means therefor.

As has been stated, lever 12 is pivotally mounted at its lower end in the box bracket 3ª. At its upper end lever 12 is formed with the head 12ª having a bifurcated portion within which is pivotally attached the plate 73 by means of pin 77. Plate 73 is adjustably secured to swage body 33 by means of the bolts 73ª extending through the arcuate slot 33ˣ in the fin 33ᵇ of the swage body 33. (See Figs. 6 and 9, for example.)

Swage body 33 is of peculiar configuration and is provided with the slot 33ᶜ at its lower portion (see Fig. 6) which is of sufficient width to permit the passage therethrough of a saw body. Slidably mounted in the swage body and transversely of the slot 33ᶜ are bearings for coacting clamping pins 62—76 having knurled or roughened engaging surfaces contactable with the sides of the saw body. The bearings or clamping pins 62—76 are moved to clamping position through the following mechanism:

A rotatable cam 60 is provided guided upon and rotatable with shaft 65 which is journaled in bushings 65ª carried in suitable apertures in swage body 33 (see Fig. 6), the swage body being recessed at 33ᵉ to accommodate the cam 60. The cam 60 is provided with flattened portions 60ª opposed and of lesser diameter than the actuating portions 60ᵇ. Formed integral with cam 60 and extending outwardly therefrom is bent arm 32 having bifurcated extremity formed by portion 32ª. At either side of the juncture of arm 32 with cam 60 are arranged peripheral flanges 60ᶜ, these being approximately cylindrical, the cam surfaces 60ª—60ᵇ being formed on both sides of the flanges 60ᶜ. Coacting with one set of these cam surfaces is a pair of levers 57 pivotally mounted upon pins 64 intermittent their extremities, these pins in turn being carried by the swage body. At one end the levers 57 contact with the clamping pins 62 while at the other end they are provided with bosses 57ª having opposed flattened surfaces upon which are slidably mounted the U-shaped shoes or cam followers 59 in contact with cam 60. Adjusting screws 65 extend through bosses 57ª for adjustment of the spacing of the clamping pins 62. The levers 57 are curved at 57ᵇ (see Fig. 9) to clear the die 61. Similar levers 58 are provided (see Figs. 1-9) which are pivoted at the pins 58ª carried by the swage body. These levers 58 each have one extremity contacting with the clamping pins 76 and are constructed similarly to arms or levers 57 at their other extremities, being likewise actuated by cam 60.

Extending between the portions 32ª of arm 32 is the pin 32ᶜ upon which is rotatably mounted the portion 27ª of a universal joint member 27. Also attached in a conventional manner is clevis 21ª of connecting rod 21 suitably attached at its other end to the second universal joint 27 providing an operative connection between the rod 21 and bell-crank 11, the latter being pivotally mounted intermediate its extremities upon the stud 10ª, as previously described. At its other extremity bell-crank 11 is pivotally attached to rod 26, (see Figs. 1 and 4) which in turn is pivotally attached at its other extremity to an extremity of rocker arm 66, carrying roller 71 contacting with the surface of cam 68. Arm 66 is pivotally mounted at one extremity upon pin 70 carried by the rear frame 5 at the bottom thereof. It will be apparent that rotation of cam 68 will result in intermittent depression of arm 66 which in turn, through the medium of rod 26, bell-crank 11, rod 21, and arm 32 will partially oscillate cam 60 causing the surfaces 60ᵇ to force the ends of the pairs of levers 57—58 apart at the cam, resulting in the advance of the clamping pins 62—76 into clamping engagement with a saw located in the slot 33ᶜ as indicated by dotted line in Fig. 6. When the cam is in non-engaging position coiled springs 62ˣ serve to move the arms 57—58 to unclamping position. (See Fig. 5.)

Extending rearwardly of the swage body 33 and lever 12 is the rod 29 carrying the ring 50 adjustable to desired position on the rod. A coiled spring 28 extends between the ring 50 and frame or other fixed location serving to partially counterbalance the weight of the swage body and allied mechanism.

Extending transversely of swage body 33 is the rotatable die 61 (see Figs. 6, 9, 11, for example) the same being of peculiar contour having the flattened portion 61ª and the rounded juncture 61ᵇ at one end of the flattened portion. At either side of the slot 33ᶜ is a bushing 63 which surrounds the die 61 being recessed or bored to fit and engage the periphery of the die. These bushings are in turn journaled in suitable apertures of the swage body. Externally thereof such bushings 63 are keyed to the lever arms 54, which in turn are secured at their outer extremities by pin 78, upon which is rotatably mounted the link 34. Carried in a substantially vertical floor in the swage body 33 is the anvil 75 of peculiar construction and having lower face coactable with die 61. The anvil 75 is adjustable in the swage body and is maintained against displacement by the die by means of the locking screw 74 additional means to prevent displacement or rotation being available, such as a set screw or the like. Assuming the die 61 to rotate in the direction of the arrow, as in Fig. 11, a saw tooth being indicated in dotted lines, the action of the die 61 is such that portion 61ᵇ, in effect eccentric, flows or upsets the metal adjacent the top of the saw tooth by coaction with the anvil 75, as will be obvious. This results in increased thickness of the saw tooth tip.

To limit the movement of the swaging die I provide an adjustable plate 33° (see Fig. 9) having a stop 33ᵖ which contacts and limits lug 54ˣ. The plate 33° is adjustably secured to swage body by bolts 33ᵈ extending through slot 33ᵃ. By providing for adjustment of the opening movement of the swaging die, provision may be made for entrance of more or less of the saw tooth to position for swaging, whereby a greater or less swaging is effected.

For adjustment of the die 61 with respect to the anvil, I provide non-rotatable locking and adjusting pin 61ˣ controlled by threaded screws 61ʸ and 61ᵛ at each end; (see Fig. 10). Pins 61ˣ are recessed as indicated at 61ᶻ and provided with a tooth 61ʷ engageable with a notch or groove in the bushings 63. The screw 61ᵛ coacts with pin 61ˣ to lock it in adjustable position, and the displacement as well as rotation is prevented by means of the set screw 61ᵗ. A set screw 61ˢ is also provided to lock the bushings 63 to the arms 54. It will be apparent that the lock screw 61ᵛ having been backed off, rotation of the adjusting screw 61ʸ will serve to advance pin 61ˣ to rotate the bushings 63ᵇ in either direction according to the direction of rotation of screw 61ʸ, and after proper adjustment lock screw 61ᵛ may be returned to locking position. To properly rotate or oscillate the die 61 for swaging coaction with the anvil 75, I provide the following mechanism:

Cam 89 on shaft 86 coacts with the rocker arm 16 which is pivoted at 16ᵃ to the upstanding pivotal bracket 7. Roller 72 is carried by arm 16 and contacts with the cam 89. At its extremity the rocker arm 16 is pivoted to a clevis 48 or connecting rod at the other end of which is a similar clevis 48 pivotally attached to arm 37 which is in turn keyed to rotatable shaft 88. It will be apparent that the cam 89 will function intermittently to oscillate or partially rotate the shaft 88. Carried by and keyed to the shaft 88 is the slotted arm 36, in the slot 36ᵃ of which, rides pin 34ᵃ carried at the extremity of link 34. It will be apparent that upon actuation of the cam 89, arm 36 will operate through the medium of link 34 partially rotating arms 54 and thereby partially rotating die 61 relative to the anvil 75 to effect swaging of the tooth, as previously described. During this swaging action, the swage body 33 is held against lateral movement by the rocker arm 12, the cam 15 being provided with a substantially cylindrical surface, serving to maintain the rocker arm 12 in fixed position for the necessary period of time. Also the swage body is held against vertical movement by its clamping engagement with the saw body. The slot in arm 36 permits lateral movement of the swage body. This slot 36ᵃ is open at its inner end to permit ready removal or insertion of pin 34ᵃ. This is desirable, for example, in treating a band-saw as when all of the teeth have been swaged a few remain to be shaped and the swage is disconnected during the shaping of these teeth.

Subsequent to the completion of the swaging, rocker arm 12 is actuated to retract or move to the left, as viewed in Fig. 1, the swage body 33 and substantially simultaneously the cam 60 is actuated to permit release of the clamping pins permitting such retraction. The swage body 33 being almost counterbalanced by the spring 28 will ride over the next tooth in succession and fall into the depression between the teeth. Thereafter rocker arm 12 moves to the right and the die engages such tooth moving the entire saw to the right to position for swaging.

After a tooth has been swaged, I find it desirable to shape or size the same to insure proper and uniform width. For this purpose I provide what I term a shaper 53 (see Figs. 12 to 14, for example). This shaper comprises the body portion 53ᵃ slotted at 53ᵇ to accommodate the saw body. Mounted in transverse apertures in the body portion 53ᵃ are actuating dies 53ᶜ having diverging surfaces 53ᵈ. Oppositely threaded screws 53ᵉ—53ᶠ are provided and in threaded engagement with the apertures of the swage body and contacting with the outer sides of the dies 53ᶜ. These screws 53ᵉ—53ᶠ are secured each in the hub of a lever 56 by means of set screws 56ᵃ or the like, two handles being secured by locking screw 56ᵇ to form in effect a single lever rotation of which will serve to mutually advance or retract the dies 53ᶜ. A tooth engaging member 56ʷ is provided, the same having a shank 56ˣ adjustably clamped between the split portions of the shaper body. This member 56ʷ is provided with notch 56ʸ adjacent one extremity and projecting into the slot between the dies 53ᶜ. The notch 56ʸ is of such construction as to engage the tip of a saw tooth as indicated in Fig. 12. When the handles 56 are moved in the direction of the arrow indicated in Fig. 12, the dies 53ᶜ will be moved together and when in proper adjustment the previously swaged tooth will be pressed to the proper thickness or width as will be obvious.

The shaper body 53 is attached in any suitable manner to an arm 14 (see Figs. 1 and 3), this arm 14 at its other extremity being pivoted to a block 14ᵃ in turn rotatable about a stud 14ᵇ projecting upwardly from plate 9, thereby forming a universal joint connection between the plate 9 and arm 14. The arm 14 intermediate its extremities is further provided with a downwardly extending lug 14ᶜ, (see Fig. 3), having a notched lower portion 14ᵈ which rides upon a stud 92ᵃ projecting from the crank arm 92 of shaft 39. This shaft 39 is rotatably journaled in brackets which project upwardly from plate 9 and are attached to a projecting extremity or arm 38, which in turn is pivotally attached to rod 40, the latter being pivotally attached to the lever 41, carrying roller 42 and pivoted at one extremity to end bar 41ᵃ carried by frame member 5 (see Figs. 3 and 4, for example). Lever 41 is actuated through roller 42 by cam 43 on cam shaft 86. This cam 43 acts through the above described mechanism or arm 14 to impart an arcuate movement thereto and to the shaper 53. This movement is so timed with respect to the other mechanisms that after swaging and shaping of the teeth prior to feeding of the saw by the swage body and die, the arm 14 and shaper 53 are moved to the left of the machine as viewed in Figs. 1 and 2, the shaper being at the same time lifted above the saw until the next tooth to be shaped has passed therebeneath, after which the shaper is returned with the arm 14 until the notched engaging member 56ʷ engages the tip of the tooth, after which actuating arms 56 are moved to actuate the dies 53ᶜ.

This mechanism is self-adjusting for teeth which vary in height or pitch. Where the shaper encounters a relatively high tooth-tip, the notch 14ᵈ permits the pin 92ᵃ to ride down out of driving relation. Also where a tooth is encountered which is relatively close to its predecessor or out of pitch the arm 14ᶜ will hold pin 92ᵃ against further movement, the roller 42 being thereby lifted out of contact with cam 43.

The actuation of the dies is performed through the medium of the following mechanism:

Shaft 91 is rotatably mounted in brackets 91ᵃ projecting upwardly from the plate 9 and is provided at one extremity with the arm 52 having an angularly disposed notched extremity engaging the levers 56 of the shaper (see Fig. 1). Also secured to the shaft 91 is the pinion segment 35 meshing with the rack 19. This rack is maintained in engagement with pinion 35 by a guard 18, projecting upwardly from and attached to the plate 9 (see Figs. 2–4, for example) the same being slotted or grooved to accommodate the rack. At one extremity the rack 19 is provided with the slotted portion 19ᵃ to which is adjustably secured by bolts 19ᵇ or the like, the bearing 19ᶜ, engaging the pin 23ᵃ of the arm 23 carried by the shaft 88, the actuation of which has been previously described.

As the shaft 88 is oscillated or partially rotated to and fro, arm 48 will reciprocate the rack 19 and partially rotate shaft 91, the guard 18 being pivoted concentrically with and upon the shaft 91. This to and fro rotation of the shaft 91 is properly timed by the cam mechanism to actuate the shaping or sizing dies at proper intervals.

When it is desired to vary the position of the shaper to accord to a variation of pitch of the teeth of a saw, the plate 9 may be moved to the left or right by means of the threaded shaft and handle 25ᶜ, in a well known manner. In making this last named adjustment, the bearing 19ᶜ is unlocked with respect to the rack 19 to permit free movement of the latter independent of the actuating mechanism until the adjustment is completed, when the bolts 19ᵇ are operated to again lock the rack 19 to the bearing 19ᶜ. Since the lug 14ᶜ of arm 14 merely rests upon the stud 92ᵃ, the latter is free to complete its arc of travel independently thereof after engagement of the member 56ʷ with the saw tooth tip. In this manner the shaping or sizing dies are properly situated prior to the shaping operation. The screws 53ᵉ may be adjusted to properly space the dies 53ᶜ.

Brackets 51ᵃ are secured to and extend upwardly from table 1 at each end thereof and at the front, and upon these brackets 51ᵃ are pivotally supported the saw guides 51, same being of convenient construction and serving to prevent vertical rise or movement of the saw during its passage through the machine. The pivotal mounting at the points 51ᵇ permits the guides to conform to any irregularities in the saw.

The machine is provided at the front thereof with an apron 44 against which the saw is frictionally pressed during its passage through the machine. A frame 46 is pivoted between the pivots 55, coil springs 46ᵈ serving to resist the opening movement of the frame 46. The latter carries a wooden strip 45 at its intervention which is adapted and constructed to press the saw body against the apron 44 and frictionally resist therewith the movement of the saw through the machine, thus preventing accidental slipping or overfeeding of the saw during its handling and treatment. An auxiliary strip 45ᵃ is also carried by frame 45, being vertically adjustable with respect thereto to accommodate saws of varying widths. A bowed laminated spring 47 is provided, same being pivoted at point 47ᵃ and having an engaging handle 47ᵇ. At its extremity spring 47 rides upon the inclined surface or rib 46ᶜ against stud 46ᵈ to exert a yielding pressure upon the frame 46 when in an upright position, also serving to prevent its dropping or opening.

Carried by the frame is a saw support 93 (see Fig. 2) which is flanged to prevent accidental displacement of the saw. In Fig. 2, as indicated by dotted lines, is shown the relative relation of a portion of a saw band with respect to the machine and the guide 93.

In the operation of my machine, assuming the member 47 to have been rotated to the right as viewed in Fig. 2 and the frame 46 let down and out, about pivots 55, the saw band may be placed on the support 93 and beneath the guides 51, it being understood that conventional supports or pedestals serve to support the saw band throughout the remainder of its length. The frame 46 is then swung to and locked in the position shown in Fig. 2 where a frictional engagement is effected, as explained above, to prevent over travel or accidental slippage of the saw band. Clutch 80, Fig. 7, being moved to engagement with the pulley 79 will result in rotation of shaft 83 and cam shaft 86. Spring 49 will move rocker arm 13 and lever 12 to the left as viewed in Fig. 1, the swage body and die riding over a tooth on the saw and dropping into the next depression, due to excess in weight of the swage body over the counter-balancing action of spring 28. Slotted arm 36 permits this retractive movements as explained above. During the movement the saw clamps 62—76 are in retracted position. As soon as the swaging body has arrived at the limit of its travel at the left, cam 15 actuates rocker arm 13 and lever 12 to move the swage body to the right, the die 61 engaging and moving or feeding the saw to the right to a swaging position. Cam 15, being provided with a substantial cylindrical portion, now maintains the swaging body in this position during the period of time necessary to effect and complete the swage. As the swage body arrives at swaging position, cam 68 actuates rod 26, bell crank 11, rod 21 and bent arm 32 to partially rotate cam 60, thereby actuating the levers 57—58 to advance the pairs of clamps 62—76 to grip the saw band and securely hold it during the swaging operation. When the clamping action just described is effected, cam 89 actuates arm 16 and thereby rocks or partially rotates shaft 88 and with it slotted arm 36, which through the medium of link 34 and arms 54 partially rotates the die 61, which as described above, coacts with anvil 75 to effect the swaging of the saw tooth tip. After the swaging is completed the respective cams and coacting mechanisms release the clamps 62—76 reversing die 61 and retracting swage body 33 preliminary to commencing a new cycle.

When the swaging body 33 is being retracted cam 43 is actuating arm 41, rod 40, arm 38 and shaft 39 to move arm 14 in its retracting arcuate path, carrying the shaper or sizing member 53 to the left, as viewed in Fig. 1, out of engagement with a saw tooth. At the same time shaft 88, through the medium of arm 23 rack 19 and segment pinion 35, is partially rotating shaft 91 and arm 52 to partially rotate arms 56 of the shaper to spread or retract the dies 53$^c$ preliminary to the next shaping operation.

After the saw band has been fed or moved to the right for swaging of the second tooth, the cam 43 actuating through the medium of the mechanism described above, the arm 14 moves the shaper 53 back along its arcuate path until the engaging member 56$^w$ contacts with and engages a saw tooth, whereupon the shaper is supported thereby preliminary to and during the shaping operation which is then performed by reverse rotation of the arms 56 effected by shaft 91, etc.

Where the mechanism is to be adjusted for a saw having teeth of greater or less pitch, the clevis 17 is adjusted on rocker arm 13 whereby the latter will impart more or less oscillation to lever 12. The die 61 and anvil 75 may be adjusted individually as previously described. Where a saw with teeth of greater or less pitch is to be handled, proper relation between the swage body 33 and shaper 53 may be maintained by advancing or retracting table 9, and with it the shaper mechanism, this movement being permitted by slacking the engagement of rack 19 with its actuating mechanism as described above.

It will be obvious that my machine is susceptible to modification, and I do not wish to be restricted to the form shown and described, except as shown in the appended claims.

What I claim is:

1. In mechanism of the class described, a swaging member comprising a body, a die, power actuated means to rotate said die, means to move said swaging member bodily, said die-rotating means being constructed and arranged to permit said bodily movement without actuation of said die.

2. In mechanism of the class described, a swaging member comprising a body, a die rotatably mounted therein, an arm operatively attached to said die, a rotatable shaft, a slotted arm carried thereby, a link having an extremity riding in the slot of said arm and pivotally attached to said die rotating arm, and means to partially rotate said shaft to and fro.

3. In mechanism of the class described, a swaging member comprising a body, a die rotatably mounted therein, an arm operatively attached to said die, a rotatable shaft, a slotted arm carried thereby, said arm being provided with a slot open at one end, a link having an extremity riding in the slot of said arm and pivotally attached to said die rotating arm, and means for partially rotating said shaft to and fro.

4. In mechanism of the class described, a swaging member, means to reciprocate said swaging member, said means comprising an oscillating lever, the swaging member being pivotally attached thereto, and means to oscillate said lever said means comprising a cam, a rocker arm actuatable thereby, said rocker arm being pivoted at one extremity, and connecting means extending between said rocker arm and said lever, said means being adjustable on said rocker arm to permit a variation in the amount of oscillation of said lever.

5. In mechanism of the class described, a swaging member, means to reciprocate said swaging member, said member being pivotally attached thereto, and means to oscillate said lever, said means comprising a cam, a rocker arm actuatable by said cam, said rocker arm being pivoted at one extremity, connecting means extending between said rocker arm and said lever, and means to maintain said rocker arm in contact with said cam, said means comprising a spring extending between said arm and said lever.

6. In mechanism of the class described, a swaging member, means to reciprocate the same, said means comprising an oscillating lever, said swaging member being pivotally attached thereto, and means to partially counterbalance the weight of the swaging member.

7. A swaging member comprising a body, a die rotatable with respect thereto, a bushing surrounding said die, said bushing being journaled in said body, and means to rotatably adjust said die relative to said body.

8. A swaging member comprising a body, a die rotatable with respect thereto, a bushing surrounding said die, said bushing being journaled in said body, and means to rotatably adjust said die relative to said body, said means comprising a screw-threaded member engaging with said bushing.

9. A swaging member comprising a body, a die rotatable with respect thereto, a bushing surrounding said die, said bushing being journaled in said body, and means to adjust said die relative to said body, said means comprising an adjusting member, said member having a notching tooth, said bushing being provided with an engageable notch, said tooth meshing in said notch, and means to advance or retract said member.

10. In mechanism of the class described, a swaging member comprising a body, opposed clamping pins carried thereby, levers to actuate said pins, a rotatable cam co-acting with said levers to actuate said pins, said cam being provided with an arm, and means to oscillate said arm, said means comprising a rotatable cam member, a pivoted lever oscillated thereby, a connecting rod attached to said lever, a pivoted bell-crank, said rod being pivotally attached to said bell-crank, and a rod operatively connecting said bell-crank with said oscillatable arm of said cam.

11. In mechanism of the class described, a shaping member provided with coacting dies, power actuated means to actuate said dies, and means to swing said shaping member and dies into and out of engagement with a saw tooth.

12. In mechanism of the class described, a shaping member provided with movable coacting dies, power actuated means to simultaneously actuate said dies, and power actuated means to swing said shaping member and dies into and out of engagement with a saw tooth.

13. In mechanism of the class described, a shaping member provided with shaping dies, and means to swing said shaping member and dies to and from shaping position with respect to a tooth to be shaped, such movement being determined by the position of said tooth.

14. In mechanism of the class described, a shaping member provided with shaping dies, and power actuated means to swing said shaping member and dies to and from shaping position with respect to a tooth to be shaped, such movement being determined by the position of said tooth.

15. In mechanism of the class described, a shaping member provided with a pair of movable coacting dies, means to rotate said dies to simultaneously advance or retract the same, said means comprising arms and means to oscillate said arms, said last-named means comprising an oscillatable arm and power actuated means to oscillate said arm.

16. In mechanism of the class described, a shaping member provided with a pair of movable coacting dies, means to rotate said dies to simultaneously advance or retract the same, said means comprising arms and means to oscillate said arms, said last-named means comprising an oscillatable arm and power actuated means to oscillate said arm, said last-named means comprising a shaft carrying said arm, a pinion carried by said shaft, a rack meshing therewith, and means to reciprocate said rack.

17. In mechanism of the class described, a shaping member provided with a pair of coacting dies, means to rotate said dies to relatively advance or retract the same, said means comprising arms and means to oscillate said arms, said last-named means comprising an oscillatable arm and power actuated means to oscillate said arm, said last-named means comprising a shaft carrying said arm, a pinion carried by said shaft, a rack meshing therewith and means to reciprocate said rack, said last-named means comprising a crank arm, and an oscillatable shaft carrying said arm.

18. In mechanism of the class described, a shaping member provided with a pair of coacting dies, means to rotate said dies to relatively advance or retract the same, said means comprising arms and means to oscillate said arms, said last-named means comprising an oscillatable arm and power actuated means to oscillate to said arm, said last-named means comprising a shaft carrying said arm, a pinion carried by said shaft, a rack meshing therewith and means to reciprocate said rack, said last-named means comprising a crank arm and an oscillatable shaft carrying said arm, a second crank arm attached to said shaft, a cam-actuated rocker arm, and a connecting rod operatively connecting said rocker arm to said second-named crank arm.

19. In mechanism of the class described, a shaper, dies carried thereby, an engaging member also carried by said shaper, said member being provided with a tooth engaging portion, and means to move said shaper and engaging member into and out of engagement with a saw tooth.

20. In mechanism of the class described, a shaper, dies carried thereby, an engaging member also carried by said shaper, said member being provided with a tooth engaging portion, and means to move said engaging member into engagement with a saw tooth and along an arcuate path.

21. In a mechanism of the class described, a shaper, dies carried thereby, an engaging member also carried by said shaper, said member being provided with a tooth engaging portion, means to move said engaging member into engagement with a saw tooth, said means comprising a swinging arm, said arm being pivoted for universal movement, and means to actuate the same.

22. In mechanism of the class described, a shaper, dies carried thereby, an engaging member also carried by said shaper, said member being provided with a tooth engaging portion, means to move said engaging member into engagement with a saw tooth, said means comprising a swinging arm, said arm being pivoted for universal movement, and means to actuate the same, said last-named means comprising an oscillatable crank constructed and arranged to support said swinging arm.

23. In mechanism of the class described, a shaper, dies carried thereby, an engaging member also carried by said shaper, said member being provided with a tooth engaging portion, means to move said engaging member into engagement with a saw tooth, said means comprising a swinging arm, said arm being pivoted for universal movement, and means to actuate the same, said last-named means comprising an oscillatable crank constructed and arranged to support said swinging arm, said crank being provided with a projecting pin, said swinging arm having a notched portion riding upon said pin.

24. In mechanism of the class described, a shaper, dies carried thereby, an engaging member also carried by said shaper, said member being provided with a tooth engaging portion, means to move said engaging member into engagement with a saw tooth, said means comprising a swinging arm, said arm being pivoted for universal movement, and means to actuate the same, said last-named means comprising an oscillatable crank constructed and arranged to support said swinging arm, and means to oscillate said crank.

25. In mechanism of the class described, a shaper, dies carried thereby, an engaging member also carried by said shaper, said member being provided with a tooth engaging portion, means to move said engaging member into engagement with a saw tooth, said means comprising a swinging arm, said arm being pivoted for universal movement, and means to actuate the same, said last-named means comprising an oscillatable crank constructed and arranged to support said swinging arm, and means to oscillate said crank, said last-named means comprising a shaft carrying said crank, and a second crank arm carried by said shaft, a rocker arm, and means operatively connecting said rocker arm to said second-named crank arm.

26. In mechanism of the class described, a shaper, dies carried thereby, an engaging member carried by said shaper, said member being provided with a tooth engaging portion, means to move said engaging member into engagement with a saw tooth, said means comprising a swinging arm, said arm being pivoted for universal movement, and means to actuate the same, said last-named means comprising an oscillatable crank constucted and arranged to support said swinging arm, and means to oscillate said crank, said last-named means comprising a shaft carrying said crank, and a second crank arm carried by said shaft, a rocker arm, means operably connecting said rocker arm to said second-named crank arm, an actuating cam, and a roller carried by said rocker arm and normally contacting with said cam.

27. In mechanism of the class described, a shaper, dies carried thereby, an engaging member carried by said shaper, said member being provided with a tooth engaging portion, means to move said engaging member into engagement with a saw tooth, said means being constructed to temporarily discontinue movement of said shaper after engagement thereof with a saw tooth.

28. In mechanism of the class described, a table, a plate slidably mounted upon said table, means to adjust said plate relative to said table, a shaper carried by said plate, dies carried thereby, means to actuate said dies, and means to move said shaper to and from shaping position.

29. In mechanism of the class described, a table, a plate slidably mounted upon said table, means to adjust said plate relative to said table, a shaper carried by said plate, dies carried thereby, means to actuate said dies, and means to move said shaper to and from shaping position, said actuating means and said shaper being supported upon said plate for adjusting movement therewith.

30. In mechanism of the class described, an adjustable plate, a shaper carried thereby, dies carried by said shaper, and means to actuate said dies, said means comprising a rotatable shaft, a pinion carried thereby, said shaft, pinion, and shaper being supported by said plate for movement therewith, and means to actuate said pinion comprising a reciprocable rack.

31. In mechanism of the class described, an adjustable plate, a shaper carried thereby, dies carried by said shaper and means to actuate said dies, said means comprising a rotatable shaft, a pinion carried thereby, said shaft, pinion, and shaper being supported by said plate for movement therewith, and means to actuate said pinion comprising a reciprocable rack, means actuating said rack, said means comprising an oscillating crank arm, said rack being adjustably connected with said crank arm.

32. In mechanism of the class described, an adjustable plate, a shaper carried thereby, dies carried by said shaper and means to actuate said dies, said means comprising a rotatable shaft, a pinion carried thereby, said shaft, pinion, and shaper being supported by said plate for movement therewith, and means to actuate said pinion comprising a reciprocable rack, means actuating said rack, said means comprising an oscillating crank arm, said rack being adjustably connected with said crank arm, a guard pivotally mounted concentric with said shaft and retaining said rack in mesh with said pinion.

33. In mechanism of the class described, a supporting table, a swaging member, means to reciprocate said swaging member, a clamping means carried by said swaging member for engagement with a saw, means to actuate said clamping means comprising an oscillating arm and means to oscillate the same, said last-named means comprising a pivoted bell-crank, means to oscillate said bell-crank, and a connecting rod extending between and operatively attached through universal joint members to said bell-crank and said oscillatable arm.

34. In mechanism of the class described, a supporting table, a swaging member, means to reciprocate said swaging member, a clamping means carried by said swaging member for engagement with a saw, means to actuate said clamping means comprising an oscillating arm and means to oscillate the same, said last-named means comprising a pivoted bell-crank, a pivotal support carried by said table and inclined with respect thereto, said bell-crank being pivoted upon said support, means to oscillate said bell-crank, and a connecting rod extending between and operatively attached through universal joint members to said bell crank and said oscillating arm.

In testimony whereof, I have subscribed my name.

EDDIE C. FILSTRUP.